United States Patent [19]

Nelson

[11] Patent Number: 4,678,080
[45] Date of Patent: Jul. 7, 1987

[54] VIDEOCASSETTE SLEEVE AND COVER

[75] Inventor: Norman E. Nelson, Roseville, Minn.

[73] Assignee: Minnesota Mining and Manufacturing Company, St. Paul, Minn.

[21] Appl. No.: 804,060

[22] Filed: Dec. 3, 1985

[51] Int. Cl.⁴ ................. B65D 85/672; B65D 43/14
[52] U.S. Cl. .................................... 206/387; 206/444; 206/1.5; 220/307; 220/339
[58] Field of Search ............... 206/387, 1.5, 444; 215/237; 220/307, 339

[56] References Cited

U.S. PATENT DOCUMENTS

| | | | |
|---|---|---|---|
| 3,904,259 | 9/1975 | Hoffmann et al. | 206/387 |
| 4,140,219 | 2/1979 | Somers | 206/387 |
| 4,253,568 | 3/1981 | Long et al. | 206/387 |
| 4,363,403 | 12/1982 | Raucci, Jr. et al. | 229/339 |
| 4,496,048 | 1/1985 | Sykes | 206/472 |
| 4,538,731 | 9/1985 | Cillario | 220/339 |

FOREIGN PATENT DOCUMENTS 2112436  9/1971  Fed. Rep. of Germany ...... 206/387

Primary Examiner—William Price
Assistant Examiner—Brenda J. Ehrhardt
Attorney, Agent, or Firm—Donald M. Sell; James A. Smith; David W. Anderson

[57] ABSTRACT

A closed, molded box for storing a videocassette includes an open sleeve, a cover and a living hinge connecting the sleeve and the cover, the hinge, the sleeve and the covering being molded simultaneously and integrally. The videocassette box may further include raised ridges on the cover and raised detents on the sleeve which engage to maintain the cover in its closed position. The cover may also include an inwardly directed protrusion adapted to contact a videocassette within the sleeve and prevent movement of the videocassette when the cover is closed.

1 Claim, 4 Drawing Figures

U.S. Patent        Jul. 7, 1987        4,678,080
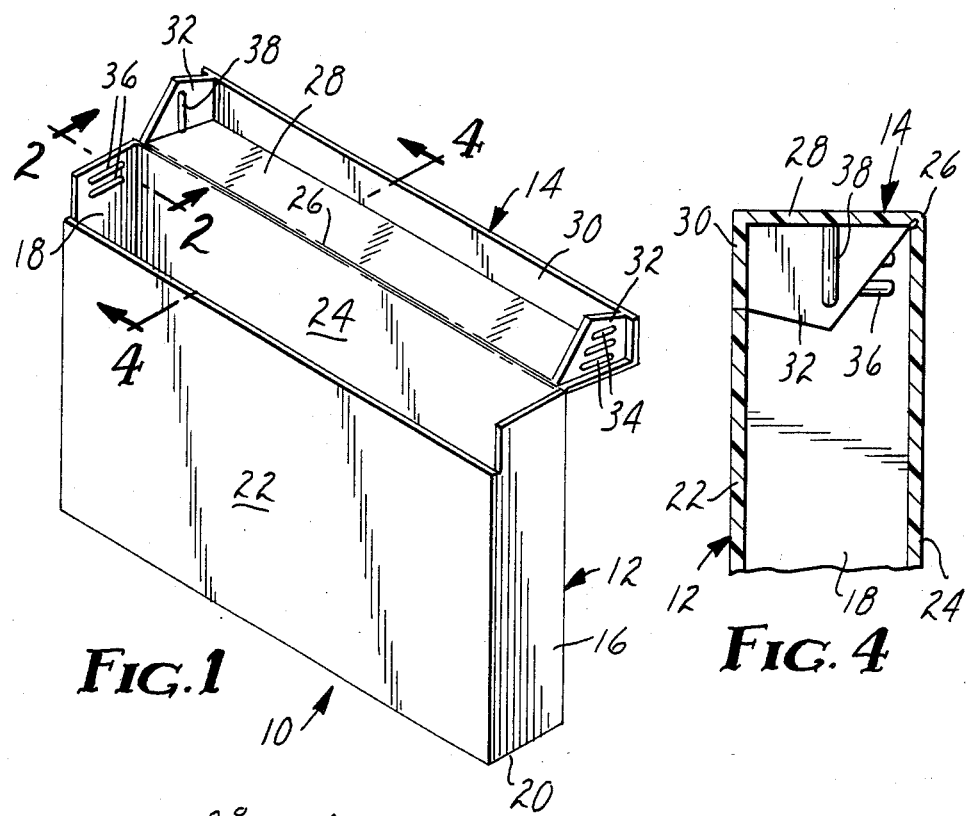
FIG. 1
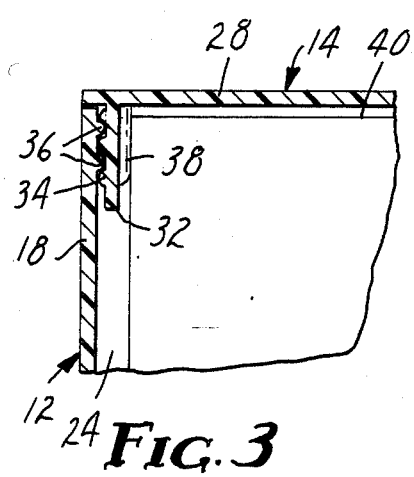
FIG. 3
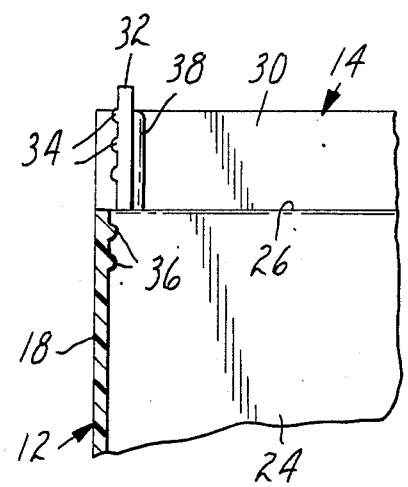
FIG. 2
FIG. 4

VIDEOCASSETTE SLEEVE AND COVER

BACKGROUND OF THE INVENTION

1. Field of the Invention

The present invention relates to molded plastic shipping and storage boxes, particularly those for use with videocassettes.

2. Description of the Prior Art

Videocassettes are presently sold to the consumer in an open sleeve which is used for storage of the videocassette between uses. Such sleeves have no closure which would prevent the entry of airborne contaminants and prevent the videocassette from sliding out of the sleeve.

SUMMARY OF THE INVENTION

The present invention is a closed, molded box for storing a videocassette or like object, which box includes an open sleeve adapted to accept a videocassette, the sleeve having rectangularly disposed first and second end walls, a first edge wall and two opposed side walls; a cover movable to a closed position wherein the cover defines a second edge wall of said sleeve; and a living hinge connecting one of the side walls of the sleeve and the cover; the hinge, the sleeve, and the cover being molded simultaneously and integrally. For locking the cover in the closed position, the molded box further includes locking walls which extend perpendicular to the cover and which are disposed adjacent and parallel to each of the sleeve end walls when the cover is in the closed position. These locking walls may also include raised ridges which interfere with raised detents on the sleeve ends walls to aid in retaining the cover in the closed position, and the locking walls may further include videocassette-positioning protrusions which project toward the interior of the sleeve to contact the videocassette within the sleeve when the cover is in the closed position to locate and prevent movement of the videocassette.

BRIEF DESCRIPTION OF THE DRAWINGS

The present invention will be more thoroughly described with reference to the accompanying drawings, wherein like numbers refer to like parts in the several views, and wherein:

FIG. 1 is a perspective view of a molded videocassette box of the present invention including a sleeve and a closing cover;

FIG. 2 is a partial cross-sectional view of the videocassette box with the cover in the open position, taken generally along the line 2—2 of FIG. 1;

FIG. 3 is a view similar to FIG. 2, with the cover in the closed position; and

FIG. 4 is a partial cross-sectional view of the videocassette box with the cover in the closed position, taken generally along the line 4—4 of FIG. 1.

DESCRIPTION OF THE PREFERRED EMBODIMENT

Referring to FIG. 1 of the drawings, there is shown a molded storage box 10 which includes a sleeve 12 and a closing cover 14. The sleeve 12 includes two end walls 16 and 18, a single edge wall 20 and two opposed side walls 22 and 24. The cover 14 is connected to the side wall 24 by a "living hinge" 26 which is molded simultaneously with the sleeve 12 and the cover 14. As best seen in FIG. 4, the hinge 26 may have a reduced cross-section to increase its flexibility. The sleeve 12, cover 14, and hinge 26 are molded simultaneously and integrally of any polymeric material which exhibits adequate strength and flexibility properties, preferably polypropylene.

The cover 14, as seen in FIG. 1, includes a horizontal wall 28 which defines a second edge wall of the sleeve 12 when the cover 14 is in its closed position. The cover 14 may also include a vertical wall 30 which forms a portion of the side wall 22 of the sleeve 12. The vertical wall 30 may be provided for aesthetic reasons and is not necessary to the present invention. Both of the opposed sides 22 and 24 of the sleeve 12 could be of equal height and the vertical wall 30 eliminated.

As best seen in FIGS. 2 and 3, the cover 14 further includes two locking walls 32 which extend perpendicularly from the horizontal wall 28 of the cover 14 and which are disposed adjacent and parallel to each of the sleeve end walls 16 and 18 when the cover 14 is in its closed position, as shown in FIG. 3. The locking walls 32 are provided to frictionally engage with the sleeve end walls 16 and 18 and frictionally retain the cover 14 in its closed position. To aid in maintaining the cover 14 in its closed position, the locking walls 32 may be further provided with raised ridges 34 which interfere with raised detents 36 located on the interior surfaces on the sleeve end walls 16 and 18. As seen in FIG. 3, the raised ridges 34 are forced past and engage the raised detents 36 when the cover 14 is moved to its closed position. No specific number of raised ridges 34 and raised detents 36 is necessary, except that at least one of the locking walls 32 must have at least one of the raised ridges 34 and the adjacent end wall 16 or 18 must have at least one raised detent 36. It is preferable, however, that both locking walls 32 and both end walls 16 and 18 be provided with raised ridges 34 and raised detents 36, respectively, to provide the greatest amount of engagement between the cover 14 and the sleeve 12. Also, the ridges 34 and detents 36 need not be elongated as shown. One or both of the ridges 34 or detents 36 may be semi-spherical, for example, and one of the raised ridges 34 or raised detents 36 could be replaced with a rece4ssed, rather than projecting, shape. In the latter case, the two structures would nest together to provide the locking function.

At least one, and preferably both, of the locking walls 32 includes a videocassette-positioning protrusion 38 which projects toward the interior of the sleeve 12 and the remaining locking wall 32. As best seen in FIGURE 3, the protrusion 38 is provided to contact a videocassette 40 when the cover 14 is in the closed position. The protrusion 38 or protrusions contacts the videocassette 40 to locate the videocassette 40 within the sleeve 12 and prevent movement of the videocassette 40.

Two protrusions 38 are preferred because two perform an important function beyond merely locating the videocassette 40 within the sleeve 12. If a protrusion 38 is located on each locking wall 32, and spaced sufficiently narrowly so as to both interfere with the videocassette 40 when the cover 14 is closed, then the videocassette 40 itself will become part of the locking mechanism. The videocassette 40 will force each protrusion 38 outwardly and thus force the locking walls 32 into contact with the end walls 16 and 18. Thus the raised ridges 34 and the raised detents 36 will be maintained in engagement and the cover will resist opening due to shock or simply the natural resiliency of the material.

Although the present invention has been described with reference to only a single embodiment, it is recognized that many modifications will be apparent to those skilled in the art. For example, while the cover 14 is preferably positioned to define one of the edge walls 28 of the box 10, the cover 14 could as easily be formed as one of the end walls 16 or 18 or one of the side walls 22 or 24. All such modifications which fall within the spirit and scope of the appended claims are intended to be included in the invention.

I claim:

1. A closed, molded box for storing a videocassette or like object, comprising:
    an open sleeve adapted to accept a said videocassette, said sleeve having rectangularly disposed first and second end walls, a first edge wall and two opposed side walls;
    a cover movable to a closed position wherein said cover defines a second edge wall of said sleeve;
    a living hinge connecting one of said sidewalls of said sleeve and said cover, said hinge, said sleeve and said cover being molded simultaneously and integrally;
    locking walls extending perpendicular to said cover and disposed within, adjacent and parallel to each of said sleeve end walls when said cover is in said closed position;
    mating projections including at least one raised ridge on at least one of said locking walls projecting toward said locking wall's adjacent end wall and at least one raised detent projecting from at least one of said end walls toward said end wall's adjacent locking wall, said raised ridge and said raised detent being disposed so that said raised ridge must be forced past said raised detent when said cover is moved to said closed position; and
    a videocassette-positioning protrusion projecting toward the other of said locking walls and adapted to contact a said videocassette within said sleeve when said cover is in said closed position, so that said videocassette will force said locking wall raised ridge and said end wall raised detent into engagement.

* * * * *